(12) United States Patent
Lee et al.

(10) Patent No.: US 7,980,466 B2
(45) Date of Patent: Jul. 19, 2011

(54) POINT-OF-SALE PROMOTIONS

(75) Inventors: Janet Lee, Union City, CA (US);
Andrew Melnick, Los Gatos, CA (US);
Zhenyin Yang, Saratoga, CA (US);
George B. Petkov, Pleasanton, CA (US);
Loic Tregan, San Jose, CA (US);
Gunshekar Cemballi, Cupertino, CA (US); Bhupendra Jain, Santa Clara, CA (US); Ghufran Ahmed, San Jose, CA (US); Jamie Iannone, Mountain View, CA (US); Erik Rannala, San Francisco, CA (US); Annupreet Sidana, Palo Alto, CA (US); Vikram Subramaniam, San Jose, CA (US)

(73) Assignee: eBay Inc., San Jose, CA (US)

( * ) Notice: Subject to any disclaimer, the term of this patent is extended or adjusted under 35 U.S.C. 154(b) by 477 days.

(21) Appl. No.: 11/643,577

(22) Filed: Dec. 21, 2006

(65) Prior Publication Data

US 2007/0276730 A1    Nov. 29, 2007

Related U.S. Application Data

(60) Provisional application No. 60/803,113, filed on May 24, 2006.

(51) Int. Cl.
*G06K 15/00*    (2006.01)
*G06Q 30/00*    (2006.01)
*G06Q 40/00*    (2006.01)

(52) U.S. Cl. ..... 235/383; 705/14.1; 705/27.1; 705/27.2; 705/26.3; 705/37

(58) Field of Classification Search .............. 235/383; 705/14, 26, 27, 26.3, 27.1, 27.2, 37
See application file for complete search history.

(56) References Cited

U.S. PATENT DOCUMENTS

| | | | |
|---|---|---|---|
| 7,107,226 B1 * | 9/2006 | Cassidy et al. | 705/26.8 |
| 2001/0037206 A1 * | 11/2001 | Falk et al. | 705/1 |
| 2002/0188503 A1 * | 12/2002 | Banerjee et al. | 705/14 |
| 2003/0069737 A1 * | 4/2003 | Koubenski et al. | 705/1 |
| 2003/0212595 A1 * | 11/2003 | Antonucci | 705/14 |
| 2004/0019494 A1 * | 1/2004 | Ridgeway et al. | 705/1 |
| 2004/0138953 A1 * | 7/2004 | Van Luchene et al. | 705/16 |
| 2004/0177009 A1 * | 9/2004 | Schrenk | 705/27 |
| 2007/0214057 A1 * | 9/2007 | Lee et al. | 705/26 |
| 2007/0266130 A1 * | 11/2007 | Mazur et al. | 709/223 |

* cited by examiner

*Primary Examiner* — Michael G Lee
*Assistant Examiner* — Laura Gudorf
(74) *Attorney, Agent, or Firm* — Schwegman, Lundberg & Woessner, P.A.

(57) ABSTRACT

A method and system to publish a promotion at a point-of-sale are provided. For example, a preliminary selection associated with a purchase from a user may be received. A promotion may be published to the user at a point-of-sale associated with the purchase after the user makes the preliminary selection and before the user finalizes the purchase. The promotion may be based on at least one attribute, where the at least one attribute is selected from a group including a user attribute and an attribute associated with the preliminary selection.

31 Claims, 8 Drawing Sheets

POINT-OF-SALE PROMOTIONS

RELATED APPLICATIONS

This application claims the priority benefit of U.S. Provisional Application No. 60/803,113, filed May 24, 2006, which application is incorporated herein by reference.

TECHNICAL FIELD

The present application relates generally to the technical field of network-based data systems and, in one specific example, to a method and system of offering feature promotions via a promotion application.

BACKGROUND

In electronic marketplace applications, promotions often entice users to make a purchase that they otherwise may not. Further, promotions often entice users to try a product or service that they might not otherwise try. In many cases, the users try the product or service and become loyal consumers, thereby increasing revenue for the electronic marketplace.

Often there are many promotions available to a user at any given time. When the user has the option to pick and choose from a set of many promotions, the selection process is time consuming, and potentially confusing. Some of the promotions may not be relevant to a particular user, and the user takes additional time to sort through the promotions to determine which ones are relevant. For users that have many purchases to make, for instance, the time it takes to sort through the promotions may be too long, and the user may lose interest in the current purchase. Also, if there are too many promotions, the user may feel overwhelmed by the experience, or perhaps confused by apparent conflicting or overlapping offers, and lose interest in the current purchase. In these instances, the promotions may actually negatively impact revenue for the electronic marketplace, due to the reduced potential purchases. The user also may be discouraged from purchasing from this site in the future, due to the length of time the process took.

Further, promotions are often applied consistently for each eligible user. However, users that would have made a particular purchase regardless of the associated promotion yields a promotion with a potential negative revenue impact.

BRIEF DESCRIPTION OF THE DRAWINGS

Some embodiments are illustrated by way of example and not limitation in the figures of the accompanying drawings in which.

DETAILED DESCRIPTION

Example methods and systems to publish a promotion at a point-of-sale are described. For example, a preliminary selection of a purchase from a user may be received. A promotion may be published at a point-of-sale to the user when the user makes the preliminary selection and before the user finalizes the purchase. The promotion may be based on an attribute(s), where the attribute(s) is (are) selected from a group including a user attribute and an attribute associated with the preliminary selection.

An interface may provide an option to the user to select the promotion. The promotion may include a discount associated with the purchase. When the user selects the promotion, a discount associated with the promotion is accounted for concurrently with the purchase at the point-of-sale.

In the feature promotions, discounts are offered in substantial real-time to a user (e.g., a seller on an electronic marketplace system) who is currently placing a listing on the electronic marketplace system. The discount offered to the user may be for an upgrade feature to promote the listing on the electronic marketplace system.

The preliminary selection of the purchase may include a listing attribute, such as listing category. The listing attribute may also simply be the user logging on to the system, for example. The purchase may be associated with a listing on a network-based commerce system and/or associated with a product offered on any electronic marketplace system.

An analysis module analyzes a rule condition associated with each promotion to determine eligibility of a user for a particular promotion and/or to filter and prioritize potential promotions to offer to the user. The analysis module may determine which of many promotions are the optimal ones to offer to the user, while not offering too many promotions so that the user is less likely to be confused, distracted, or overwhelmed by the process. In the case where there are apparent conflicting or overlapping promotions, the analysis module may determine the optimal or higher priority promotion, and just display that one or those ones to the user to the exclusion of the other promotions. Further, promotions that are not relevant to the user may also be filtered by the analysis module, again to not distract the user and to keep the user moving forward in the purchase process (i.e., placing a listing on the electronic marketplace).

Eligibility for a particular promotion may be determined by the analysis module in real-time as the user is listing on the system, for instance. The eligible promotions are analyzed and displayed as part of the listing process, and generally displayed before the user loses interest in the purchase or becomes impatient with the process.

Every promotion may not be offered to every user. Again, the analysis module filters promotions that are conflicting. In addition, the analysis module may filter promotions for products the user may already regularly purchase. These promotions are filtered because they may translate directly into lost revenue during the promotional period.

For these reasons, the process is streamlined with the analysis module in keeping with a goal of moving users forward in the purchasing process, and leaving the users with a desire to purchase again via the electronic marketplace.

In the following description, for purposes of explanation, numerous specific details are set forth in order to provide a thorough understanding of example embodiments. It will be evident, however, to one skilled in the art that the present invention may be practiced without these specific details.

Architecture

Figure 1:
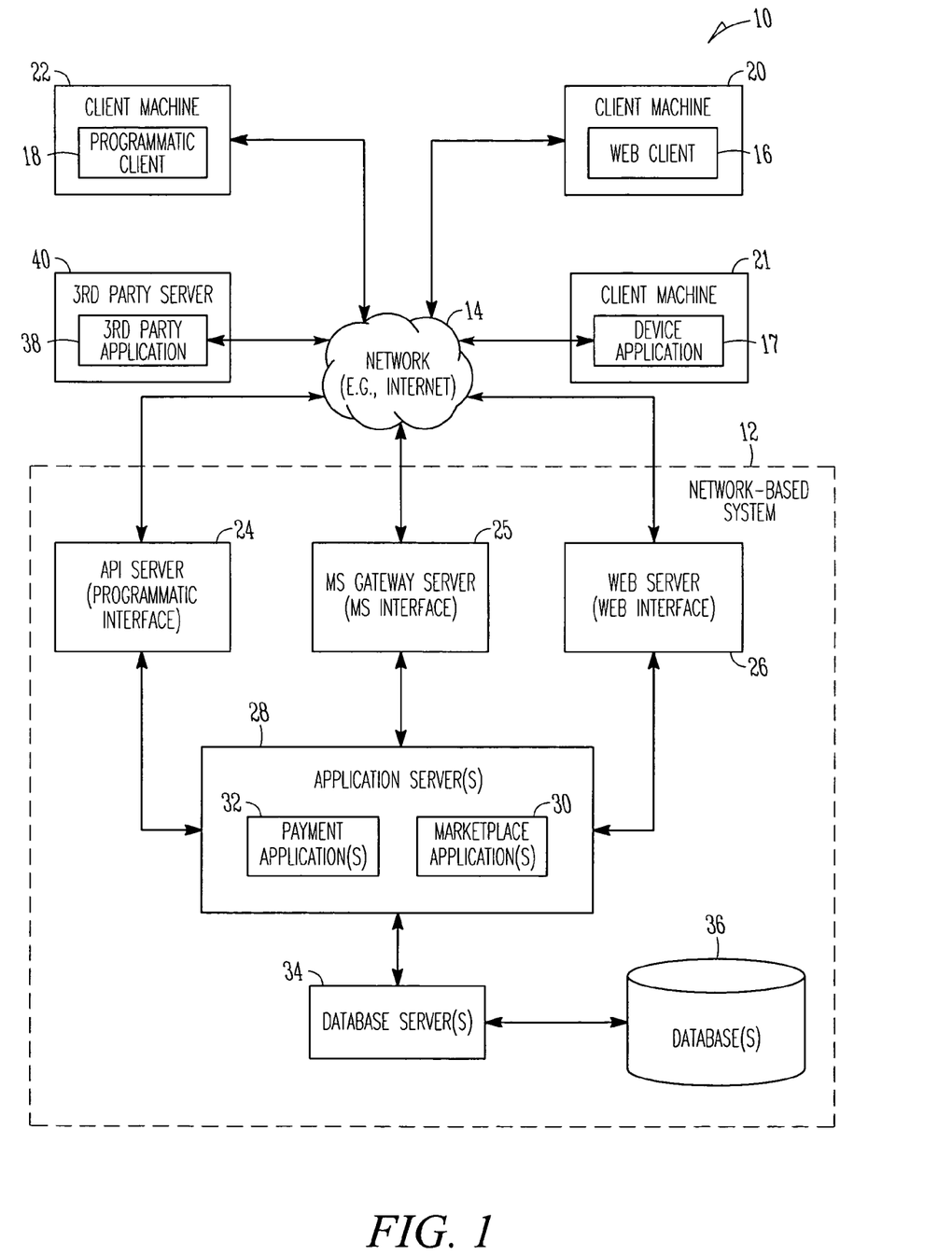
FIG. 1 illustrates a network diagram depicting a system, according to an example embodiment, having a client-server architecture.

FIG. 1 illustrates a network diagram depicting a system 10 having a client-server architecture, according to an example embodiment of the present invention. A system, in the example form of an electronic system 12, provides server-side functionality, via a network 14 (e.g., the Internet, a public or private telephone network (wireline or wireless), a private wireless network using technologies such as Bluetooth or IEEE 802.11x or other networks) to one or more clients. FIG. 1 illustrates, for example, a web client 16 (e.g., a browser, such as the Internet Explorer® browser developed by Microsoft®), and a programmatic client 18 executing on respective client machines 20 and 22, e.g. on a network-based device. Additionally, a device application 17 may execute on a client machine 21. Further, while the system 10 shown in FIG. 1 employs a client-server architecture, embodiments are of course not limited to such an architecture, and could equally well find applications in a distributed, or peer-to-peer, architecture system.

The client machines, including network-based device(s) 20, 21, 22, may include a mobile device, a palmtop computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The device 20, 21, 22 may include a card, such as a smart card, a magnetic card, and/or a key card. The device may include a telephone or any device capable of Short Messaging Service (SMS) messaging, instant messaging (IM), multimedia messaging service (MMS) messaging and/or generating audio tones, such as dual-tone multi-frequency (DTMF) tones. The device may be browser-enabled. The device may engage in an interactive message and/or open communication session, such as SMS, IM, electronic mail, xHTML, Wireless Application Protocol (WAP), web, interactive voice response (IVR) and/or other mobile interfaces. The interactive messaging or open communication session may involve multiple technology modalities, e.g. the client user may engage the system via SMS and receive a responsive communication from an IVR Server or as an SMS with an embedded hyperlinked URL directing the client user's device to a WAP or web page. A hyperlinked URL may be delivered directly to the device from the application server(s) 28 and may be used to access a web site or a microbrowser, such as a WAP site. The device 20, 21, 22 may enable mobile videophone communications, digital television signals, and/or digital radio signals. The device may include a receiver to receive near field communications as described in more detail herein. The scanner device may include a bar code reader/scanner, a Radio Frequency Interface System (RFIS) reader, and/or a symbol reader/scanner.

Turning specifically to the network-based system 12, an Application Program Interface (API) server 24, a Messaging Service (MS) Gateway Server 25, and a web server 26 may be coupled to, and may provide programmatic, MS, and web interfaces, respectively to, one or more application servers 28. The devices may use one or more of these interfaces to access the application server(s) 28.

The application server(s) 28 may host one or more marketplace application(s) 30 and one or more payment application(s) 32. The application server(s) 28 are, in turn, shown to be coupled to one or more database servers 34 that facilitate access to one or more databases 36.

The marketplace applications 30 may provide a number of marketplace functions and services to users that access the networked system 12. The payment applications 32 may likewise provide a number of payment services and functions to users. The payment applications 32 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the networked system 12, it will be appreciated that, in alternative embodiments, the payment applications 32 may form part of a payment service that is separate and distinct from the networked system 12.

Further, while the system 12 shown in FIG. 1 employs a client-server architecture, the present subject matter is of course not limited to such an architecture, and could equally well find application in a distributed, or peer-to-peer, architecture system, for example. The system 12 and the various marketplace and payment applications 30 and 32 could also be implemented as standalone software programs, which do not necessarily have networking capabilities. In this example, the device 20, 21, 22 may be directly connected to the marketplace application(s) 30, without using the network 14. The electronic system 12 may be any store having a database with rule conditions, for example, www.walmart.com (service mark of Wal-Mart Stores, Inc.) or www.llbean.com (service mark of L. L. Bean, Inc.).

The client devices may access the various marketplace and payment applications 30 and 32 via the web interface supported by the web server 26, via the programmatic interface supported by the API server 24, and/or via the MS Interface supported by the MS Gateway Server 25.

The device 20, 21, and/or 22 may be used by the user to publish their listings on the marketplace application(s) of the network-based system 12. The web and programmatic interfaces may be considered the point-of-sale when the user/seller publishes/lists their listings on the electronic marketplace.

The point-of-sale may also be a physical location where a marketplace transaction occurs. Wherever a product or service may be sold, the product or service may be sold where a point of sale system is in use.

The web interface may include a web browser or any microbrowser, such as xHTML or WAP. Similarly, the programmatic client 18 accesses the various services and functions provided by the application server(s) 28, via the programmatic interface provided by the API server 24 and/or the web server 26. The programmatic client 18 may, for example, be a seller application (e.g., the TurboLister® application) to enable sellers to author and manage listings on the networked system 12 in an off-line manner, and to perform batch-mode communications between the programmatic client 18 and the networked system 12.

In an additional embodiment, an application supported by one or more applications of the application server(s) may be downloadable to the network-based device. The device(s) may host the interface associated with the one or more applications of the application server(s) 28. The interface on the device may be an API interface, an MS interface, a web interface, and/or another other appropriate communication interface. Consumer wireless device platforms, such as Java 2 Platform Micro Edition (J2ME), J2SE and J2EE allow developers to use Java and a wireless toolkit to create applications and programs for the device 22. The J2ME interface may include an application programming interface (API) for the device. The application of the programmatic client may also access the Internet using, for example, Binary Runtime Environment for Wireless (BREW).

The device application 17 executed on the client machine 21 may access the application server(s) 28 via the web interface of the web server. The application 17 may be selected on the device and the Internet may be launched in a background. The application 17 may additionally or alternatively access the server(s) 28 via the MS interface of the MS Gateway server 25, and/or via the programmatic interface of the API server 24. In an embodiment, the downloaded application described herein may include the device application 17.

The application(s) 17 may have access to the database 36 having, for example, the personal user account information through, for example, the database server(s) 34. The web client 16, the device application 17, and/or the programmatic client 18 may operate a program supported by the one or more database server(s) 34.

The network 14 may include a mobile telephone network, a wireless wide area network (WWAN), a wireline telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite, Micro-impulse Radar, Radio Frequency identification (RFID), UltraWide Band, and/or Infrared. The network-based device may connect to the web using mobile internet exchange, e.g. Wireless Application Protocol (WAP) and/or Hypertext Transport Protocol (HTTP).

FIG. 1 also illustrates the third party application 38 as having programmatic access to the network-based system 12 via the programmatic interface provided by the API server 24. The third party website may, for example, provide one or more promotional, marketplace or payment functions that are supported by the relevant applications of the network-based system 12.

Application Server(s)

Figure 2:
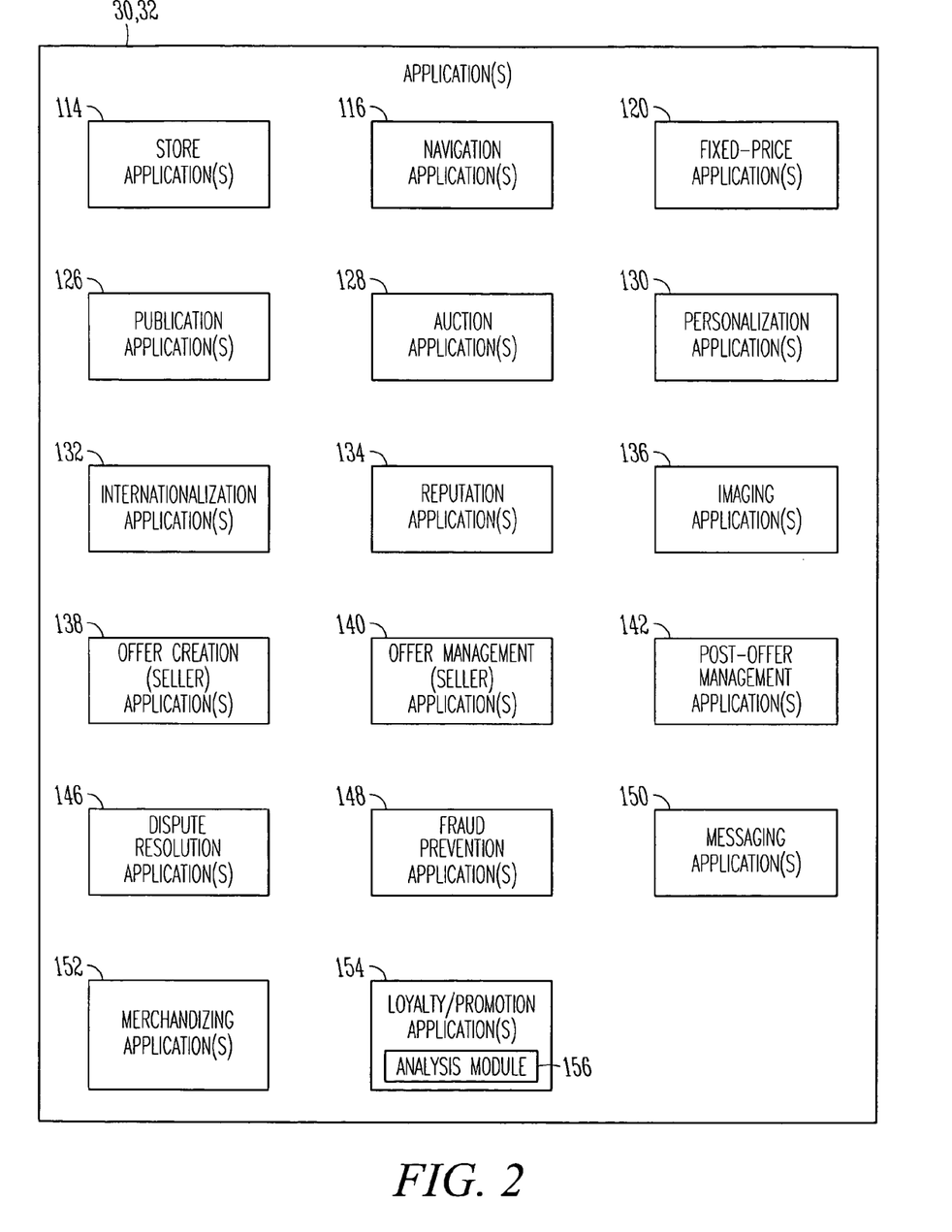
FIG. 2 illustrates a block diagram showing marketplace and payment application(s) in an example embodiment.

FIG. 2 illustrates a block diagram showing application server(s) that are part of the network-based system 12, in an example embodiment of the present invention. In this embodiment, the marketplace application(s) 30, and the payment application(s) 32 may be hosted by the application server(s) 28 of the network-based system 12. The applications 30 and 32 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications 30, 32 may furthermore access one or more of the databases 36 via the database servers 34.

The marketplace application(s) 30 may provide a number of marketplace functions and services to client users, such as a buyer, and/or to third parties, such as sellers or vendors, who access the system 12. The marketplace applications 30 may provide a number of offering mechanisms and price-setting mechanisms; whereby a seller may list goods or services for sale, a seller may promote their offers, a buyer can express interest in or indicate a desire to purchase such goods or services or to donate, and a price can be set for a transaction pertaining to the goods or services.

Store applications 114 allow a seller to group listings within a "virtual" store, which may be branded and otherwise personalized by and for the seller. Such a virtual store may also offer promotions, incentives and listing selling features that are specific and personalized to a relevant seller.

Navigation of the networked system 12 may be facilitated by one or more navigation applications 116. For example, a search application (as an example of a navigation application) may enable key word searches of listings published via the networked system 12. A browse application may allow users to browse various category, catalogue, or inventory data structures according to which listings may be classified within the networked system 12. Various other navigation applications may be provided to supplement the search and browsing applications.

A number of fixed-price applications 120 support fixed-price listing formats (e.g., the traditional classified advertisement-type listing or a catalogue listing) and buyout-type listings. Specifically, buyout-type listings (e.g., including the Buy-It-Now® (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

To this end, the marketplace applications 30 are shown to include at least one publication application 126 and one or more auction applications 128 which support auction-format listing and price setting mechanisms (e.g., English, Dutch, Vickrey, Chinese, Double, Reverse auctions etc.). The various auction applications 128 may also provide a number of features in support of such auction-format listings, such as a reserve price feature whereby a seller may specify a reserve price in connection with a listing and a proxy-bidding feature whereby a bidder may invoke automated proxy bidding. The auction-format offer in any format may be published in any virtual or physical marketplace medium and may be considered the point of sale for the commerce transaction between a seller and a buyer.

Personalization applications 130 allow users of the networked system 12 to personalize various aspects of their interactions with the networked system 12. For example a user may, utilizing an appropriate personalization application 130, create a personalized reference page at which information regarding transactions to which the user is (or has been) a party may be viewed. Further, the personalization application(s) 130 may enable a third party to personalize products and other aspects of their interactions with the system 12 and other parties, or to provide other information, such as relevant business information about themselves.

The marketplace applications 30 may include one or more internationalization applications 132. In one embodiment, the network-based system 12 may support a number of marketplaces that are customized, for example, for specific geographic regions. A version of the system 12 may be customized for the United Kingdom, whereas another version of the system 12 may be customized for the United States. Each of these versions may operate as an independent marketplace, or may be customized (or internationalized) presentations of a common underlying marketplace. The networked system 12 may accordingly include a number of internationalization applications 132 that customize information (and/or the presentation of information) by the networked system 12 according to predetermined criteria (e.g., geographic, demographic or marketplace criteria). For example, the internationalization applications 132 may be used to support the customization of information for a number of regional websites that are operated by the networked system 12 and that are accessible via respective web servers.

Reputation applications 134 allow users that transact, utilizing the networked system 12, to establish, build and maintain reputations, which may be made available and published to potential trading partners. Consider that where, for example, the networked system 12 supports person-to-person trading, users may otherwise have no history or other reference information whereby the trustworthiness and credibility of potential trading partners may be assessed. The reputation applications 134 allow a user, for example through feedback provided by other transaction partners, to establish a reputation within the networked system 12 over time. Other potential trading partners may then reference such a reputation for the purposes of assessing credibility and trustworthiness.

In order to make listings, available via the networked system 12, as visually informing and attractive as possible, the marketplace applications 30 may include one or more imaging applications 136 utilizing which users may upload images for inclusion within listings. An imaging application 136 also operates to incorporate images within viewed listings. The imaging applications 136 may also support one or more promotional features, such as image galleries that are presented to potential buyers. For example, sellers may generally pay an additional fee to have an image included within a gallery of images for promoted items.

The marketplace applications 30 may include one or more offer creation applications 138. The offer creation applications 138 allow sellers conveniently to author products pertaining to goods or services that they wish to transact via the system 12. Offer management applications 140 allow sellers to manage offers, such as goods, services, or donation opportunities. Specifically, where a particular seller has authored and/or published a large number of products, the management of such products may present a challenge. The offer management applications 140 provide a number of features (e.g., auto-reproduct, inventory level monitors, etc.) to assist the seller in managing such products. One or more post-offer management applications 142 also assist sellers with a number of activities that typically occur post-offer. For example, upon completion of an auction facilitated by one or more auction applications 128, a seller may wish to leave feedback regarding a particular buyer. To this end, a post-offer management application 142 may provide an interface to one or more reputation applications 134, so as to allow the seller conveniently to provide feedback regarding multiple buyers to the reputation applications 134.

The dispute resolution application(s) 146 may provide mechanisms whereby disputes arising between transacting parties may be resolved. For example, the dispute resolution applications 146 may provide guided procedures whereby the parties are guided through a number of steps in an attempt to settle a dispute. In the event that the dispute cannot be settled via the guided procedures, the dispute may be escalated to a mediator or arbitrator.

A number of fraud prevention applications 148 implement fraud detection and prevention mechanisms to reduce the occurrence of fraud within the networked system 12. The fraud prevention application(s) 148 may implement various fraud detection and prevention mechanisms to reduce the occurrence of fraud within the system 12. The fraud prevention application(s) may prevent fraud with respect to the third party and/or the client user in relation to any part of the request, payment, information flows and/or request fulfillment. Fraud may occur with respect to unauthorized use of financial instruments, non-delivery of goods, and abuse of personal information.

The application server(s) 28 may include messaging applications 150. The messaging applications 150 are responsible for the generation and delivery of messages to client users and third parties of the network-based system 12. Such messages, for example, advise client users regarding the status of products (e.g., providing "out of stock" or "outbid" notices to client users). Third parties may be notified of a product order, payment confirmation and/or shipment information. Respective messaging applications 150 may utilize any one have a number of message delivery networks and platforms to deliver messages to users. For example, messaging applications 150 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 152 support various merchandising functions that are made available to sellers to enable sellers to increase sales via the networked system 152. The merchandising applications 152 also operate the various merchandising features that may be invoked by sellers, and may monitor and track the success of merchandising strategies employed by sellers.

The network-based system 12 itself, or one or more parties that transact via the system 12, may operate loyalty programs and other types of promotions that are supported by one or more loyalty/promotions applications 154. For example, a buyer/client user may earn loyalty or promotions points for each transaction established and/or concluded with a particular seller/third party, and may be offered a reward for which accumulated loyalty points can be redeemed.

The loyalty/promotions applications 154 may include an example promotion application that offers a promotion to entice seller-users in real-time while the seller-user is listing their item or service on the network-based commerce system. The promotion's purpose includes compelling seller-users to list more frequently, or always list, with the network-based commerce system offering the promotion. In addition, the purpose includes offering the seller-user an additional feature to buy to generate revenue for the network-based commerce system.

Promotion of listing upgrades and the various listing formats may be an effective vehicle to drive both adoption and revenue. The promotions are targeted based on a variety of user (e.g., a seller on the electronic marketplace) and listing characteristics during a listing flow (i.e., purchase process). Further, this promotion type may keep revenue from being lost by non-targeted promotions.

In the feature promotions, discounts are offered in real-time to the user on upgrade features for a listing while the user is listing with the system 12. For example, the discount is offered during the time that the user is listing on the marketplace, as opposed to being issued as a credit at a later time. The features include selling features that prominently display publications (i.e., seller listings) on the system 12.

There are several types of discounts, for example: a discounted feature fee (e.g., feature fee for Bold feature is $0.75), a discount amount off from base price (e.g., feature fee for Bold feature is discounted by $0.20, where the actual charge may be $1.00−0.20=$0.80), and a discount percent off from base price (e.g., feature fee for Bold feature is discounted by 15%, where the actual charge may be $1.00−0.15=$0.85).

The promotions may associated with applicable purchases (e.g., listings) on the system 12, wherein the listings are in auction format, fixed price format, stores format and/or advertising format.

Discounts associated with the promotions are given during the listing process, while the user-seller is listing the publication. In this embodiment, because the discount is offered immediately, a credit associated with the discount is not given, although in other embodiments, a credit may be given. The promotions may be offered to the user-seller in "real-time" or dynamically based on user-seller input during the listing flow to target particular users or particular listings. Because the process is dynamic, the system may not pull lists of users to target market in some embodiments. The users dynamically qualify as they begin the listing process. The discounted price for the promotion may also be dynamic based on selected promotions.

Promotions the seller is qualified for are displayed to user/seller, and the user/seller can select or ignore the promotion. If the seller does not qualify for a promotion, none are presented. The promotions may be pre-announced before the user begins a listing process via multiple channels (email and Real-time Messaging) to change user behavior patterns. The promotions also may be surprise, in-session promotions to cross-sell and up-sell features.

Site-wide promotions or users targeted by list may also be used with real-time promotions. For example, the analysis module lists these promotions along with other promotions in the selection for the user during the listing. In an example, 2 promotions are available to the user: (1) free bold and (2) ½ off bold+gallery. An analysis module 156 or an algorithm of the loyalty/promotion application may determine to offer both to seller, and let the seller decide which one to take, or may just offer one of the two.

Figure 3:
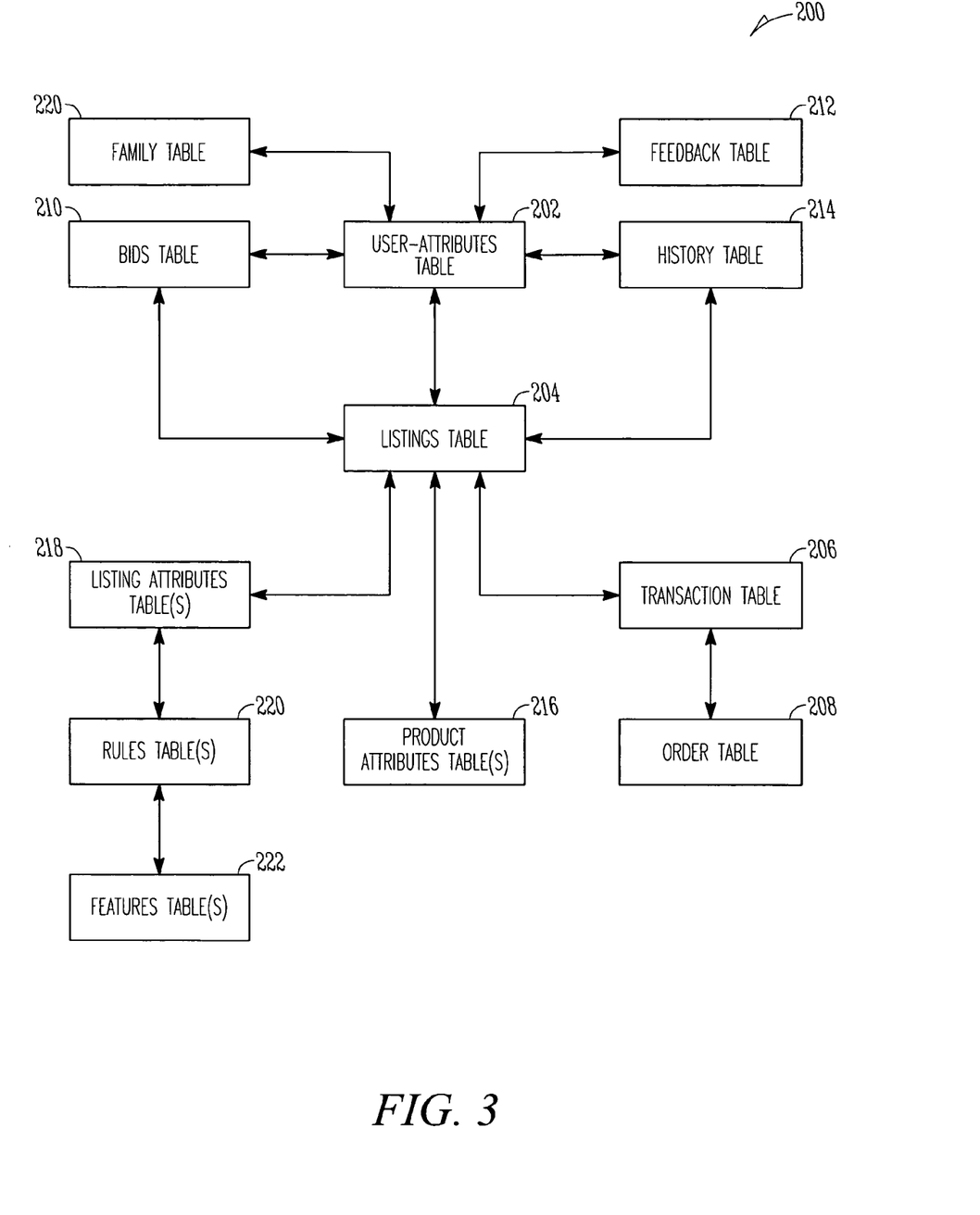
FIG. 3 illustrates a high-level entity-relationship diagram, illustrating various tables that may be maintained within one or more databases, according to an example embodiment.

The analysis module 156 may eliminate duplicate promotions, filter out conflicting promotions, prioritize the remaining promotions and returns at least one optimal promotion to the seller-user. The analysis module 156 may receive rule conditions from a rules table 220, listing attributes from a table 218, and user attributes from a table 202 as input for determination of promotions published to the user in real-time while the user is listing their item or service on the system 12. The analysis module 156 outputs the rule conditions that the current user qualifies for, as well as the associated promotion information. This information is displayed in real-time to the user at the client side as the user is listing. The user makes a selection that may or may not include the promotion.

The rules table and associated analysis module offers the flexibility to add, remove, and/or modify promotions without incurring additional development costs because changes to promotions may be made simply by modifying the rules table.

Figure 6:
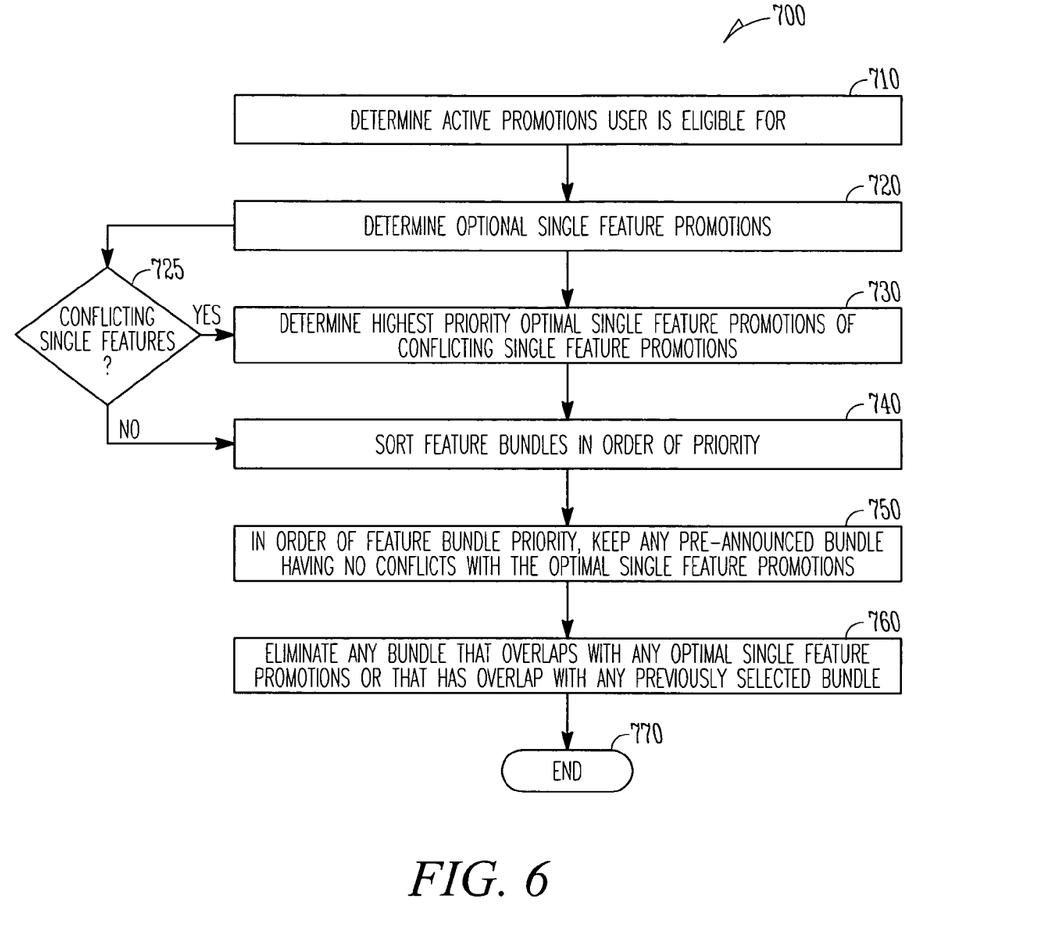
FIG. 6 illustrates a flow chart of a method, according to an example embodiment of the present invention.

The analysis module 156 is further discussed with regard to the flow chart at FIG. 6.

Data Structures

FIG. 3 illustrates a high-level entity-relationship diagram, having various tables 200 that may be maintained within the database(s) 36 according to an example embodiment. The tables 200 may be utilized by and support the application(s) of the application server(s). The database(s) 36 may, in one embodiment, be implemented as a relational database, and includes a number of tables having entries, or records, that are linked by indices and keys. In an alternative embodiment, the database(s) 36 may be implemented as a collection of objects in an object-oriented database.

A user attributes table 202 contains a record for each registered user of the networked system 12. A user may operate as a seller, a buyer, or both, within the networked system 12. In one example embodiment, a buyer may be a user that has accumulated value (e.g., commercial or proprietary currency), and is accordingly able to exchange the accumulated value for items that are offered for sale by the networked system 12. The user attribute may be selected from a group including: number of feedbacks obtained, positive feedback percentage, verifiable street address on file, time on file (length of time), associated country, date of first listing, date of last listing, total number of listings (and frequency of listing), total number of listings that sold, date last used PayPal®, date a particular feature was last used, and total number of times a particular feature was used.

The tables 200 also include a listings or items table 204 in which are maintained item records for goods and services that are available to be, or have been, transacted via the networked system 12. Each item record within the items table 204 may furthermore be linked to one or more user records within the user table 202, so as to associate a seller and one or more actual or potential buyers with each item record.

A transaction table 206 contains a record for each transaction (e.g., a purchase or sale transaction) pertaining to items for which records exist within the items table 204. In addition to transactions taking place between users on the system, the transaction table 206 may include a record for the specific transaction (e.g., a purchase transaction) under consideration in the analysis module 156. The transaction table 206 may include information such as the user, the category or other listing features, status, price paid, date, and other transaction-related information.

An order table 208 is populated with order records, each order record being associated with an order. Each order, in turn, may be associated with one or more transactions for which records exist within the transaction table 206.

Bid records within a bids table 210 each relate to a bid received at the networked system 12 in connection with an auction-format listing supported by an auction application 128. A feedback table 212 is utilized by one or more reputation applications 134, in one example embodiment, to construct and maintain reputation information concerning users. A history table 214 maintains a history of transactions to which a user has been a party. One or more product attributes tables 216 record attribute information pertaining to items for which records exist within the items table 204. Considering just a single example of such an attribute, the attributes tables 216 may indicate a currency attribute associated with a particular item, the currency attribute identifying the currency of a price for the relevant item as specified by a seller.

The tables 200 may include one or more listing attributes tables 218. The listing attributes tables 220 record attributes of a listing and/or a publication including site, country ID, location ID; format; category; PayPal® accepted; shipping instructions; which listing selling features are selected; catalog based; product ID; item return policy; starting price; fixed-price amount; reserve price; quantity of items for listing; currency selected for listing; number of photos; item sequence number, item duration; item re-listed; item listed in 2nd category; application ID; item return policy; listing tool used and user login.

The tables 200 may include one or more rules tables 220 listing the rule conditions used by the analysis module 156. Example rule conditions include, but are not limited to: If the user is listing from TurboLister®, offer $2.00 off insertion fees; if the user is listing through a 3rd party tool, offer 5% off insertion fees; offer users Gallery, Bold, Highlight for $2.00; offer new users Subtitle and Bold for free"; if this is a first-time lister, offer them insertion fees for free; if this user has never used Bold, offer 45% discount; if user lists in the Books category, then offer $2.00 off the price of premium package; if user lists with Fixed Price Format in the Women's clothing category, then offer Penny Gallery Day (PGD) or First Three Listings Free including Gallery or $0.05 Subtitle; if seller has never used Bold feature, then this feature is offered for free to seller for this listing; if seller has never used Bold or Gallery feature, then these listing selling features are offered for a substantial discount (2 for 1 sale, etc.); if item is being relisted, then offer 50% off insertion fee ("if, then" rule condition); if the user selects Bold, then offer Highlight for free; if user selects PayPal, offer Gallery Featured for $5.00; offer Free listing day (FLD) for items with a starting bid between $25.00-$49.99 (if the items has a starting bid is $60, it may not qualify for the promotion); if the user lists the item in their Store for 60 days, offer 30% off Bold; and offer discounted Insertion Fees varying from $0.30 to $4.80, for example, depending upon listing price and category.

For counter-like behavior, various rule conditions may be used. For example, when the user-seller is new to the system, certain feature fees may be waived. Some examples include the following: for cumulative listings=0, the first 3 listings insertion feature fee=0; for cumulative Gallery feature use=0, the Gallery feature fee=0; for cumulative Subtitle feature use=0 and Cumulative Gallery feature use >1, the Subtitle feature fee=0; for cumulative Border feature use=0, cumulative listings >5, Border feature fee=50% off; for category=Apparel, Collectibles, or Jewelry, the Picture Pack Feature fee=50% off; for cumulative listings >0 and Cumulative listings <5 and Cumulative sold listings=0, the Listing Designer feature fee=0; and for cumulative listings >25, the cumulative "premium package" use=0, the "premium package" feature fee=50% off. If the user cannot select the feature (because they are ineligible), then the BASE PRICE may be displayed and the user may not be aware of the promotion at all. The premium package feature may be $19.95 for those users with an amount of feedback ratings of 10 or more. If user has <10 feedback, the premium package feature field may not be available to add a value. As a result, if there is a premium package promotion, then the user sees the BASE PRICE. The user may not receive the promotion price because the does not have attributes that meet the criteria. For a package bundle, the bundle may not be displayed if it includes a feature the user is ineligible for. For example, possible feature selections include a Bundle (Bold @ $0.50) and include a premium package ($5.00), and a Bold promotion (where, for example, Bold is 50% off). For any number of reasons, the user doesn't qualify for the premium package feature, and based on example rule conditions, the bundle has preference over the Bold promotion. As a result, the Bundle messaging may not be displayed, and the Bold feature at 50% off may be displayed. The analysis module 156 simply filters any promotion that includes a feature the user is ineligible for.

The tables 200 may include one or more features tables 222. The features tables 222 record features of listings that the user may select or purchase, including: title & description (t&d), pictures & details (p&d), subtitle, fixed price amount, reserve price amount, 10-day listing, schedule listing, gallery, gallery featured, eps, 2-12 pictures, supersize, picture show, picture pack (1-12 pictures, supersize, picture show, gallery), listing designer, bold, border, highlight, premium package, homepage featured, gift services, 10-day listing, motors homepage featured (includes gallery featured), icon, and a professional package (bold, border, highlight, premium package).

Interaction Chart

Figure 4:
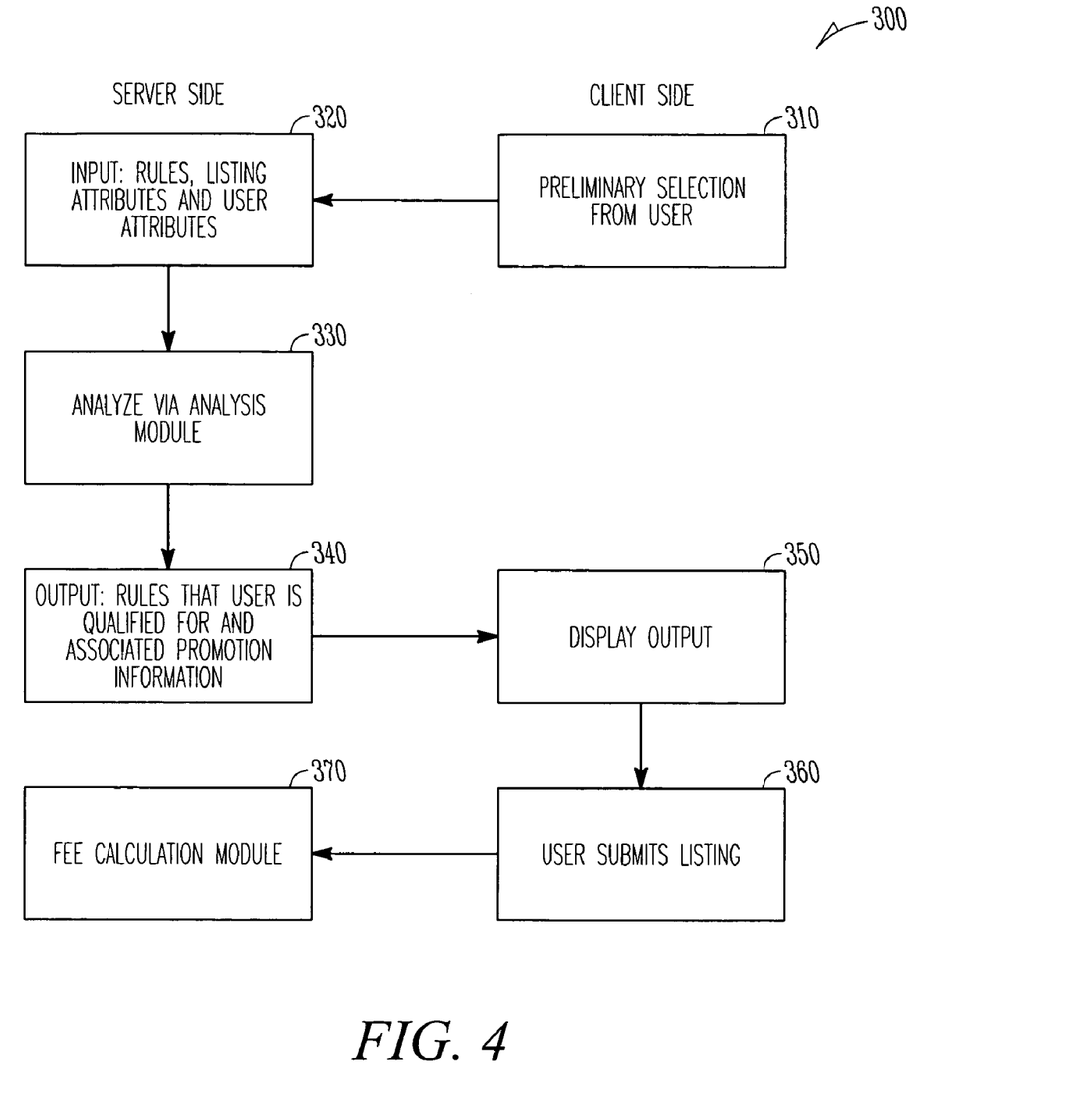
FIG. 4 illustrates an interaction chart in an example embodiment.

FIG. 4 illustrates an interaction chart 300 in an example embodiment. In the interaction chart 300, a preliminary selection at 310 is made by a user on the client side. The preliminary selection may be a simple login by the client, and may be a selection of category into which to place the listing, or any other possible trigger as a preliminary selection of a purchase on the system 12. At the server side, at 320, rule conditions from the rules table 220, listing attributes from the corresponding table 218, and user attributes from the corresponding table 202 are gathered as input. The analysis module 156 at 330 uses the input for determination of promotions published to the user in real-time while the user is listing their offer on the system 12. The analysis module 156 outputs at 340 the rule conditions that the current user qualifies for, as well as the associated promotion information. This information is displayed at 350 in real-time to the user at the client side. The user makes a selection at 360 that may or may not include the promotion, and the server side proceeds to calculate a cumulative feature fee with a fee calculation module 370 based on the selections made by the user.

Once the seller has selected the promotions, the Fee Calculation module 370 computes the listing fees and displays them to the user. The user then has an opportunity to review the fees and decide whether to submit or cancel their listing.

User Interfaces

Figure 5A:
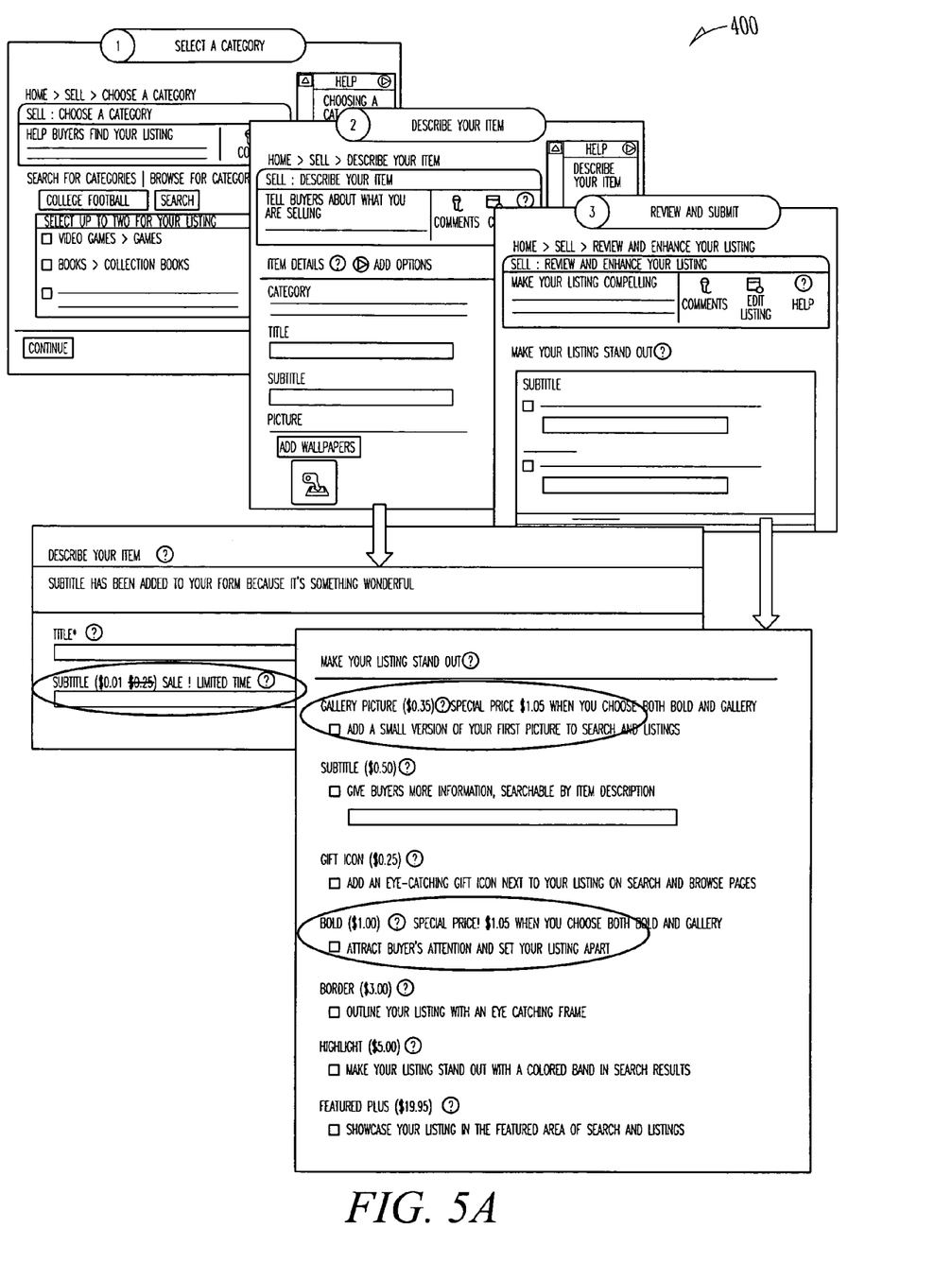
FIGS. 5A and 5B illustrate interfaces according to an example embodiment.
Figure 5B:
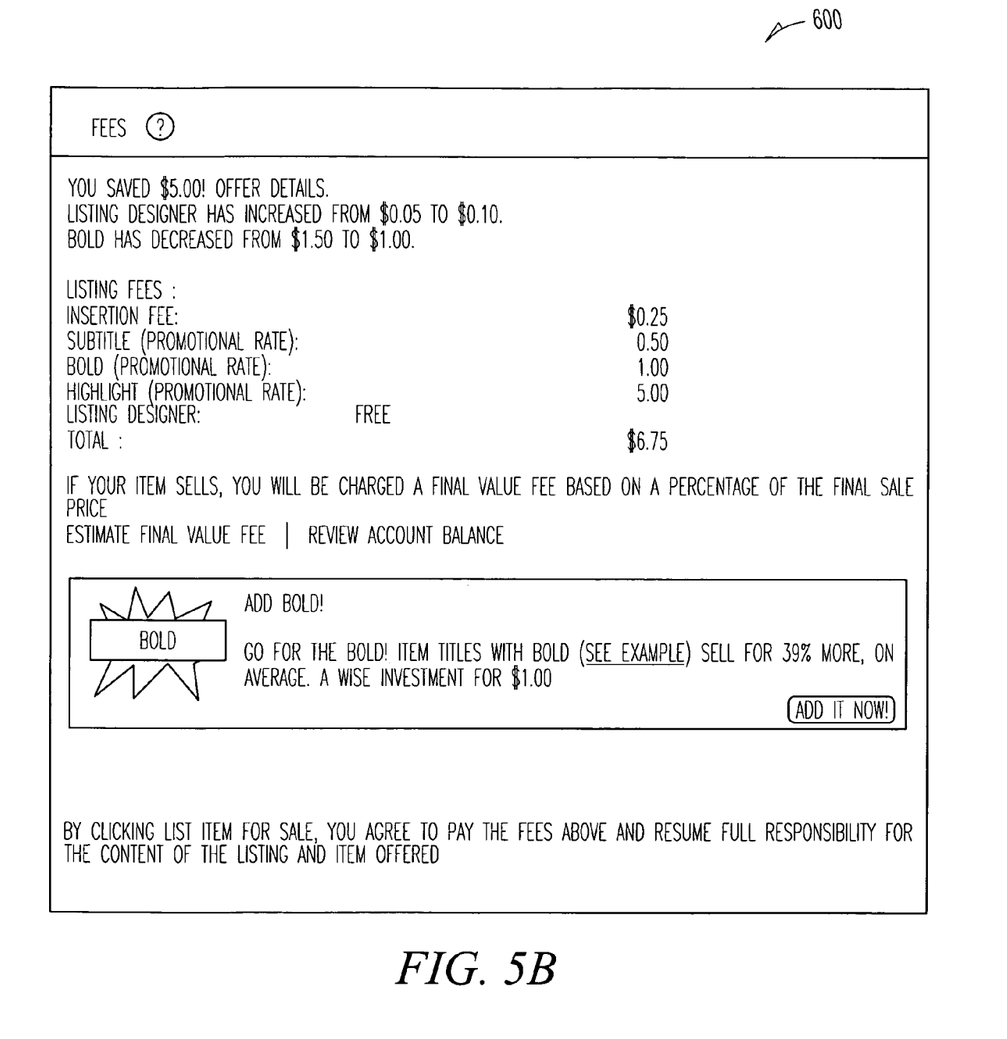

FIGS. 5A and 5B illustrate interfaces 400 and 600 according to an example embodiment. A feature promotion may be offered to each member of the system, or may be available just to targeted individuals based on specific characteristics of the user or of the listing. The feature promotion may be for either a single feature or a feature bundle promotion. The Feature Bundle Promotion is a combination of single features, groups of features offered to the user at a single combined price (e.g. Gallery+Bold+Highlight for a discounted price). The feature bundle price may be selected by the business, as well as the specific features in the bundle.

Example single feature rule conditions (recorded on the rules table) are: If <seller has never used Picture Service>, then <offer Picture Service for free>, and If <the item is being re-listed>, then <offer 50% off insertion feature fee>. In the first example, the condition is based on the user attribute, and in the second example, the condition is based on the listing attribute. Example Feature Bundle includes: If <seller has never used Bold or Gallery>, then <offer Bold and Gallery for $1.05>; and If <date of last listing was more than 6 months ago>, then <offer Bold and Gallery for $1.05>.

Flowcharts

FIG. 6 illustrates a flow chart of a method 700, according to an example embodiment of the present invention. The method 700 may include the algorithm associated with the analysis module 156. The method 700 includes at 710, determine active promotions the user is eligible for, or qualifies for at the system. There may be single feature promotions and/or feature bundles. The promotions may be previously announced or not.

At 720, determine optimal single feature promotions. Optimal may include a "best" price for the user, or the optimal promotion for the system.

At 725, query whether there are conflicting single feature promotions, in particular, conflicting apparent rule conditions, as described in more detail below. If there is a conflict, then proceed to determination 730. If no conflicts, then proceed to sort 740.

At 730, determine the highest priority optimal single feature promotions, when there are conflicting single feature promotions.

At 740, sort the feature bundles in order of priority.

At 750, in order of bundle priority, keep any bundle that was pre-announced and has no conflict with the features already selected at 720.

At 760, eliminate any bundle from display that either: a) has overlap with a single feature that has already been selected at 720 or b) has overlap with a previously selected bundle.

At 770, the process ends when the list of promotions is forwarded to the user interface for display to the qualified seller (user). The promotions are displayed on the listing flow. The seller has the option to select any promotion they want or to ignore them.

Table 1 summarizes possible combinations:

TABLE 1

|  | Single Feature-Pre-announced | Single Feature In-session | Feature Bundle Pre-announced | Feature Bundle In-session |
|---|---|---|---|---|
| Single Feature-Pre-announced | Best Price | Single Feature-Pre-announced | Feature Bundle Pre-announced | Single Feature Pre-announced |
| Single Feature-In-session | Single Feature Pre-announced | Best Price | Feature Bundle Pre-announced | Feature Bundle In-session |
| Feature Bundle-Pre-announced | Feature Bundle Pre-announced | Feature Bundle Pre-announced | Higher Priority | Feature Bundle Pre-announced |
| Feature Bundle-In-session | Single Feature Pre-announced | Feature Bundle In-session | Feature Bundle Pre-announced | Higher Priority |

The analysis module 156 determines if the user is qualified to receive a promotion, based on seller and/or listing attributes. The module 156 may have the following rule conditions; Single feature takes precedence over feature bundle; of conflicting singles, keep single with optimal price; if multiple single promotion for same feature with same price, then keep promotion with higher priority; sort features and bundles by priority; keep pre-announced promotion that does not conflict with single feature promotion; exclude bundle with conflict to single; exclude bundle with conflict with another bundle; and use priority for case where more than one promotion for the same single feature with the same promotional price is available.

If there is no overlap/conflict between a set of promotions, the user should receive each promotion that applies. In the case of conflicting promotions (e.g., the same feature appears in two promotions that the user qualifies for), the analysis module 156 is used to resolve the conflict in real-time while the user is listing. The "conflict" may be defined as follows: the analysis module 156 evaluates the "THEN" clause. The rule conditions may be examined at the following levels: Rule conditions within the same territory (e.g. U.S. territory); rule conditions within a Territory vs. Language level rule conditions for the appropriate language (e.g. U.S. territory vs. English language); rule conditions within a Territory vs. Vertical level rule conditions (e.g. U.S. territory vs. Vertical); and rule conditions at a Language level vs. Vertical level rule conditions (e.g. French language rule conditions vs. vertical rule conditions).

In an example, there is a conflict, two promotions are found for the same single feature: The price in one Single Feature promotion is greater than or equal to the price in the other Single Feature promotion, or it may be inconclusive whether one single feature promotion is more expensive than the other (e.g., B=10% off vs. B=$0.05 discount). In another set of conflicts, two or more Feature Bundle promotions are found where there is overlap in any of the features in the bundle: B (Bold)+G (Gallery), where (B=$0.15)+(G=$0.90); (G+H), wherein (G=$0.85)+(H=$2.50). In another example conflict: two or more promotions are found where there is conflict between a feature in a Feature Bundle and the same feature in a Single Feature promotion and the price of the feature in the Single Feature promotion is greater than or equal to the price of the same feature in the Feature Bundle Promotion, or it may be inconclusive if one feature is more expensive than the other; e.g., B(bold)=$0.40 off base price; B+G is offered at for $1.05, where B=$0.15 and G=$0.90; B=$0.10; G=$0.95; B+G for $1.05, where B=$0.15 and G=$0.90; B=50%; G=$0.75; B+G for $1.05, where B=$0.15 and G=$0.90. The analysis module 156 may solve these conflicts in real-time based on actual user selections.

In an example, if the seller used the bold feature less than 5 times and they are re-listing their item today, then they may be offered Bold for ½ off. In this example, the promotion includes two criteria and one feature fee reduction. The rules table of the database does not limit the number of criteria or the number of feature fee reductions, thus the promotion may become quite complex, making the evaluation difficult and manual evaluation almost impossible. The algorithms by themselves are challenging but to have these algorithms execute in real-time while the user/seller is on the site submitting their listing adds to the challenge. The algorithm response times are minimized while the accuracy is maximized for a user experience of the highest possible quality.

In another example, items that have the titles featured in bold may sell for at least 25% more on average, as compared with similar items that do not have bold titles. Users optimize their profits if the cost for the bold (ex: $1 for Bold) is less than the 25% price increase (e.g., sell their item for at least $4 to make the purchase of the bold feature worth it). Once users realize that the features benefit them, they may more frequently use that feature, which may in turn, increase revenue for the electronic system, both in purchase of the features at the front end, and in the increased final value fee. Users may be more successful in their own featured sales through the use of targeted promotions of features that can impact the seller's conversion rate. Increased success may more likely translate into an increase in continued usage by the user.

While the criteria of promotion conditions themselves may increase in complexity due to the availability of the algorithm, the volume of promotions may also increase significantly. Promotions may be offered based on criteria or conditions, such as characteristics of the seller or characteristics of their listing, which are objective and achievable by each user equally.

The target for promotions may be infrequent sellers, or sellers that do not use any features regularly or just use a certain feature regularly. The user/seller may find that the features do help promote and sell their item, and sell their items faster, with more bids, and thus, with a higher sale price. The promotions may also drive a trial of features that the user does not otherwise use. Permanent revenue for the electronic marketplace may be created by an adoption lift though the changed listing behavior of user-sellers.

The algorithm or analysis module may also be considered 'smart' in that the algorithm may anticipate feature bundles to offer the user in a personalized bundle package because of known features the user has selected or is likely to select. Because a user may be thinking about fees and saving money while listing, they may be inclined to choose a personalized bundle that offers them a discount.

Promotion Success Analysis may be conducted by ad-hoc queries, such as number of promotions qualified, shown and accepted for seller; feature adoption rate before, during and after a promotion; revenue per promotion by listing and feature; promotion tracking; number of sessions qualified, shown, and accepted; number of items qualified, shown, and accepted; promotion history; and list of promotions by site including category, condition, and feature(s) being promoted.

Users may revise a listing, in the instance, for example, where no bids have yet been made on the listing from potential buyers. Users may qualify for a promotion on features in the instance where they originally qualified for the original promotions, where they currently qualify for the original promotions, and/or where they qualify for current promotions. In some scenarios, if the seller-user did not qualify during the original listing, then they do not qualify just because they are revising their listing. In another scenario, if a seller qualified for a promotion at the time of listing but did not select the promotion, they may qualify for the promotion when revising the listing if the promotion is still active. However, the seller-user may not be offered the promotion if the promotion has since expired. In yet another scenario, if the promotion was inactive at the time the listing was originally placed, but becomes active at the time of relisting, the seller-user may not be shown the promotion. The promotion qualification may be determined by the seller profile obtained during the original listing session.

Platform Architecture

Figure 7:
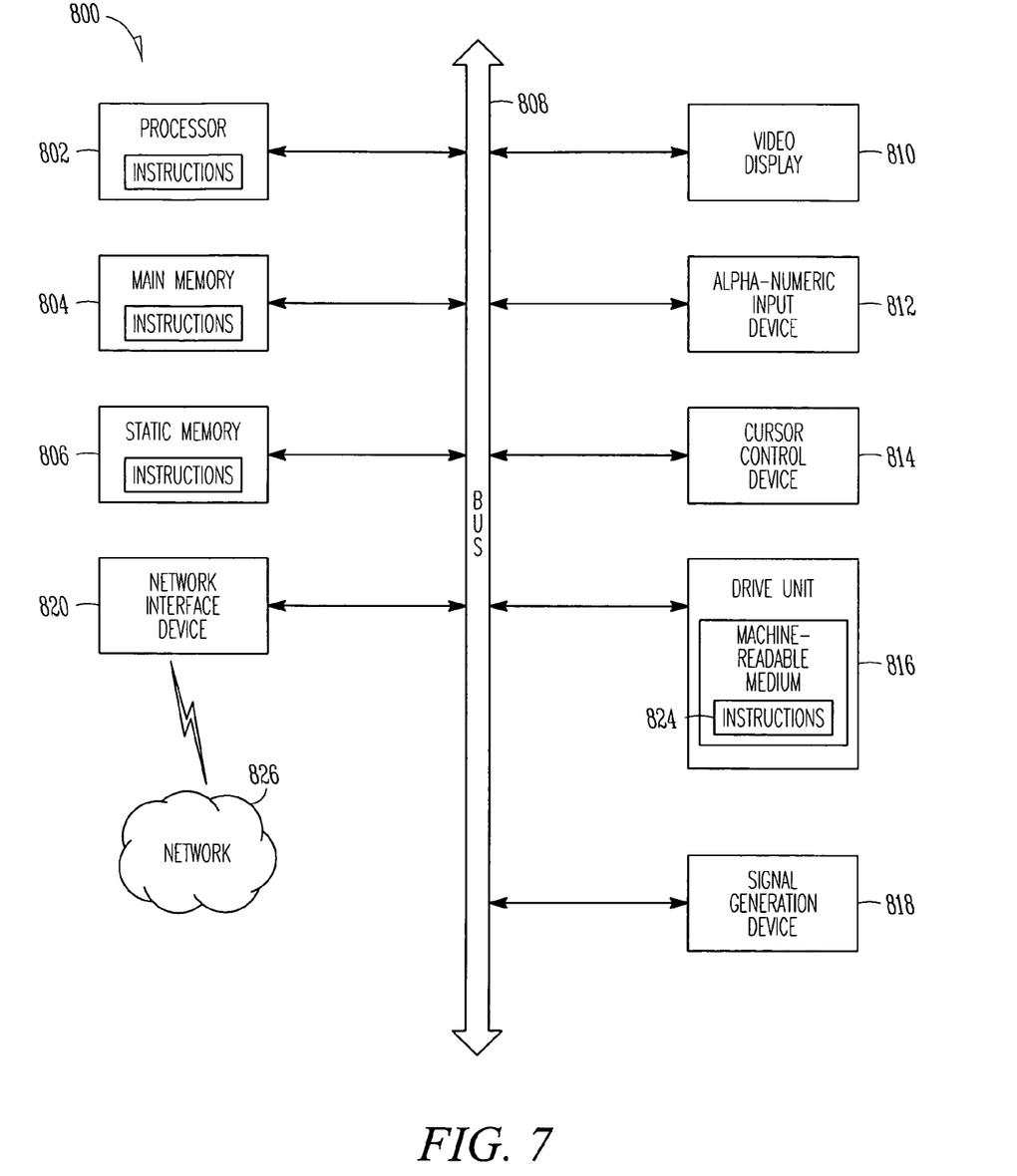
FIG. 7 illustrates a diagrammatic representation of a machine in the form of a computer system within which a set of instructions, for causing the machine to perform any one or more of the methodologies discussed herein, may be executed, according to an example embodiment.

FIG. 7 shows a diagrammatic representation of a machine in the example form of a computer system 800 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a television, television cable a pager, a personal trusted device, a web appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media.

The instructions 824 may further be transmitted or received over a network 826 via the network interface device 820.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 7 are merely representational and may not be drawn to scale. Certain proportions thereof may be exaggerated, while others may be minimized.

Thus, a method and system to publish a promotion at a point-of-sale have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims. In the Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

What is claimed is:

1. An electronic system to publish a promotion at a point-of-sale, the system comprising:
   a database including at least one user attribute;
   an interface to:
      receive, from a user a preliminary selection associated with a purchase of a listing for placement of an item for sale on a commerce system;
      publish at least one promotion to the user at the point-of-sale associated with the purchase after the user makes the preliminary selection and before the user finalizes the purchase of the listing, the at least one promotion being based on at least one attribute associated with the listing; and
      provide the user with an option to ignore selection of the at least one promotion in completing the purchase of the listing; and
   an analysis module to:
      determine features to promote the listing on the commerce system; and
      determine promotions the user is eligible for based on the at least one attribute, the promotions comprising single feature promotions and feature bundles, the feature bundles being a plurality of single feature promotions grouped together. the feature promotion being a promotion for one or more features determined to promote the listing on the commerce system;
      prioritize and filter the promotions for which the user is eligible; and
      determine the at least one promotion to publish to the user using the interface.

2. The system of claim 1 wherein the interface provides an option to the user to select the promotion.

3. The system of claim 1 wherein the promotion includes a discount associated with the purchase.

4. The system of claim 1 wherein the interface provides an option to the user to select the promotion, and wherein, when the user selects the promotion, a discount associated with the promotion is accounted for concurrently with the purchase at the point-of-sale.

5. The system of claim 1 wherein the analysis module is to filter the promotions by removing promotions for features the user regularly purchases.

6. The system of claim 1 wherein the promotion includes a discount associated with the listing, and wherein the discount is associated with the feature to promote the listing.

7. The system of claim 1 wherein the preliminary selection of the purchase includes user login to the system.

8. The system of claim 1 wherein the point-of-sale includes a network-based commerce transaction.

9. The system of claim 1 wherein the at least one attribute comprises a listing attribute associated with the listing, the listing attribute including a selection from at least one of the groups of a site of user, country ID of user, location ID of user; listing format; listing category; an online payment system accepted for listing; listing shipping instructions; which listing selling features are selected; whether the listing is catalog based; listing product ID; return policy; listing starting price; fixed price amount; listing reserve price amount; quantity of items for listing; currency selected for listing; number of photos; item sequence number, item duration; item re-listed; item listed in 2nd category; application ID; item return policy; listing tool used; and user login.

10. The system of claim 1 wherein the at least one attribute comprises a user attribute, the user attribute including a selection from at least one of the groups of an amount of feedback, positive feedback percentage, verifiable street address on file, time on file, associated country, date of first listing, date of last total number of listings, total number of listings that sold, date last used an online payment system, date a particular feature was last used, and total number of times a particular feature was used.

11. The system of claim 6 wherein the feature comprises a selection from at least one of the groups of bold, highlight, border, appear first on list, picture, multiple pictures, subtitle, gallery, gallery featured, bold, border, highlight, premium package, home page featured, scheduled listings, 10-day duration, list in two categories, gift services, listing designer, basic fee, insertion, picture services, reserve services, and fixed-price services.

12. The system of claim 1 wherein the analysis module is further configured to:
   receive a rule condition associated with each promotion;
   analyze each rule condition, when the user makes the preliminary selection, to determine each rule condition that applies to the user; and
   communicate to the interface each rule condition that applies to the user.

13. An electronic system to publish a promotion at a point-of-sale, the system comprising:
   a database including at least one user attribute and including at least one promotion rule condition;
   an interface to receive, from a user, a preliminary selection associated with a purchase of a listing for placement of an item for sale on a commerce system; and
   an analysis module to determine, based on the at least one promotion rule condition, the at least one user attribute, and the preliminary selection, eligibility of a particular promotion for the user at the point-of-sale, the particular promotion being determined from promotions comprising single feature promotions and feature bundles, the feature bundles being a plurality of single feature promotions grouped together, the feature promotion being a promotion for one or more features to promote the listing on the commerce system,
   based on the user being eligible for the particular promotion, the interface is to publish the particular promotion at the point-of-sale to the user when the user makes the preliminary selection and before the user finalizes the purchase of the listing, the interface further to provide the user with an option to ignore selection of the at least one promotion in completing the purchase of the listing.

14. An electronic system to publish a promotion at a point-of-sale, the system comprising:
   a database including at least one user attribute;
   an interface to:
      receive, from a user, a preliminary selection associated with a purchase of a listing for placement of an item for sale on a commerce system;

publish at least one promotion to the user at the point-of-sale associated with the purchase after the user makes the preliminary selection and before the user finalizes the purchase of the listing, the at least one promotion being based on at least one attribute associated with the listing; and provide the user with an option to ignore selection of the at least one promotion in completing the purchase of the listing; and an analysis module to:

receive a rule condition associated with each promotion, the promotions comprising single feature promotions and feature bundles, the feature bundles being a plurality of single feature promotions grouped together, the feature promotion being a promotion for one or more features determined to promote the listing on the commerce system;

analyze each rule condition, when the user makes the preliminary selection, to determine the at least one promotion to present to the user; and communicate to the interface the at least one promotion to be published to the user.

15. The system of claim 14 wherein the interface provides an option to the user to select the promotion.

16. The system of claim 14 wherein the promotion includes a discount associated with the purchase.

17. The system of claim 14 wherein the interface provides an option to the user to select the promotion, and wherein, when the user selects the promotion, a discount associated with the promotion is accounted for concurrently with the purchase at the point-of-sale.

18. The system of claim 14 wherein the analysis module is to filter the promotions by removing promotions for features the user regularly purchases.

19. The system of claim 14 wherein the promotion includes a discount associated with the listing, and wherein the discount is associated with the feature to promote the listing.

20. The system of claim 14 wherein the preliminary selection of the purchase includes user login to the system.

21. The system of claim 14 wherein the point-of-sale includes a network-based commerce transaction.

22. The system of claim 18 wherein the at least one attribute comprises a listing attribute associated with the listing, the listing attribute including a selection from at least one of the groups of a site of user, country ID of user, location ID of user; listing format; listing category; an online payment system accepted for listing; listing shipping instructions; which listing selling features are selected; whether the listing is catalog based; listing product ID; return policy; listing starting price; fixed price amount; listing reserve price amount; quantity of items for listing; currency selected for listing; number of photos; item sequence number, item duration; item re-listed; item listed in 2nd category; application ID; item return policy; listing tool used; and user login.

23. The system of claim 14 wherein the at least one attribute comprises the user attribute, the user attribute including a selection from at least one of the groups of an amount of feedback, positive feedback percentage, verifiable street address on file, time on file, associated country, date of first listing, date of last listing, total number of listings, total number of listings that sold, date last used online payment system, date a particular feature was last used, and total number of times a particular feature was used.

24. The system of claim 19 wherein the feature comprises a selection from at least one of the groups of bold, highlight, border, appear first on list, picture, multiple pictures, subtitle, gallery, gallery featured, bold, border, highlight, premium package, home page featured, scheduled listings, 10-day duration, list in two categories, gift services, listing designer, basic fee, insertion, picture services, reserve services, and fixed-price services.

25. The system of claim 14 wherein the analysis module is further configured to:

determine which listing selling features to promote to the user while the user is on a web site associated with the electronic system;

determine which electronic system promotions the user is eligible for based on the at least one user attributes; and prioritize and filter the promotions that the user is eligible for to display the filtered promotions to the user.

26. The system of claim 1, further comprising sorting the feature bundles in order of priority.

27. The system of claim 1, further comprising eliminating any feature bundles that has an overlap with a single feature promotion previously selected by the user.

28. The system of claim 1, further comprising eliminating any feature bundles that has an overlap with a feature bundle previously selected by the user.

29. The system of claim 1, wherein the purchase is a purchase of a listing on an electronic marketplace system and the promotions are directed to features to enhance the listing.

30. The system of claim 1, wherein the analysis module is to prioritize and filter the promotions by eliminating duplicate promotions, filtering out lower priority conflicting promotions, and prioritizing remaining promotions after the eliminating and filtering.

31. The system of claim 1, further comprising eliminating any feature bundles that has comprises a single feature that the user is not eligible.

* * * * *

UNITED STATES PATENT AND TRADEMARK OFFICE
CERTIFICATE OF CORRECTION

PATENT NO. : 7,980,466 B2  
APPLICATION NO. : 11/643577  
DATED : July 19, 2011  
INVENTOR(S) : Janet Lee et al.

Page 1 of 1

It is certified that error appears in the above-identified patent and that said Letters Patent is hereby corrected as shown below:

In column 8, line 58, delete "$1.00-0.20=$0.80)," and insert -- $1.00-$0.20=$0.80), --, therefor.

In column 8, line 61, delete "0.15" and insert -- $0.15 --, therefor.

In column 17, line 21, in Claim 1, after "user" insert -- , --.

In column 17, line 40, in Claim 1, delete "together." and insert -- together, --, therefor.

In column 18, line 9, in Claim 9, delete "number," and insert -- number; --, therefor.

In column 18, line 16, in Claim 10, after "date of last" insert -- listing, --.

Signed and Sealed this  
Twenty-second Day of November, 2011

David J. Kappos  
*Director of the United States Patent and Trademark Office*